(12) United States Patent
Åberg et al.

(10) Patent No.: US 6,388,233 B1
(45) Date of Patent: May 14, 2002

(54) METHOD AND APPARATUS FOR ARC WELDING WITH MELTING ELECTRODE

(75) Inventors: Per Åberg; Lars Bengtsson, both of Laxå(SE)

(73) Assignee: ESAB AB, Göteborg (SE)

( * ) Notice: Subject to any disclaimer, the term of this patent is extended or adjusted under 35 U.S.C. 154(b) by 0 days.

(21) Appl. No.: 09/403,620

(22) PCT Filed: May 5, 1998

(86) PCT No.: PCT/SE98/00829

§ 371 Date: Nov. 5, 1999

§ 102(e) Date: Nov. 5, 1999

(87) PCT Pub. No.: WO98/50190

PCT Pub. Date: Nov. 12, 1998

(30) Foreign Application Priority Data

May 5, 1997 (SE) ................................................. 9701696

(51) Int. Cl.[7] .................................................. B23K 9/09
(52) U.S. Cl. ......................... 219/137 PS; 219/130.21; 219/130.33; 219/130.51
(58) Field of Search ..................... 219/130.51, 130.21, 219/130.31, 130.32, 130.33, 137 PS

(56) References Cited

U.S. PATENT DOCUMENTS

| | | | | |
|---|---|---|---|---|
| 3,496,330 A | * | 2/1970 | Needham | ............... 219/130.51 |
| 4,647,754 A | * | 3/1987 | Hirasawa | ............... 219/130.51 |
| 4,697,062 A | | 9/1987 | Awano et al. | |
| 4,758,707 A | | 7/1988 | Ogilvie et al. | |
| 4,889,969 A | * | 12/1989 | Kawai et al. | ........... 219/130.51 |
| 5,157,236 A | * | 10/1992 | Batzler et al. | ......... 219/130.51 |
| 5,270,516 A | * | 12/1993 | Hamamoto et al. | .... 219/130.21 |

FOREIGN PATENT DOCUMENTS

| | | |
|---|---|---|
| EP | 0170248 | 2/1986 |
| JP | 57109573 | 7/1982 |
| JP | 1118371 | 5/1989 |
| JP | 623547 | 2/1994 |
| WO | 9300195 | 1/1993 |

\* cited by examiner

*Primary Examiner*—Clifford C. Shaw
(74) *Attorney, Agent, or Firm*—Nils H. Ljungman & Associates

(57) ABSTRACT

The invention comprises a method and an arrangement for pulsed gas metal-arc welding with an electrode fed to the welding site continuously at a given rate, the fusion conditions being adapted in such a manner that the material transfer from the electrode (7) to the workpiece (8) takes place essentially without short-circuiting drops by the welding current being periodically increased to a pulse current of such size and duration that the current density in the electrode causes sufficient electromagnetic forces in order to separate one drop for each pulse, and where the arc length is stabilized by regulating the power supply for the arc by means of a regulator mainly on the basis of a measured arc voltage, characterized in that short-circuiting of the arc is detected as arc-voltage decreases and/or current increases, and in that the fusion power supplied is increased by the arc-length regulator being given an additional increase for each short-circuit detected.

14 Claims, 3 Drawing Sheets

US 6,388,233 B1

METHOD AND APPARATUS FOR ARC WELDING WITH MELTING ELECTRODE

TECHNICAL FIELD

The present invention relates to a method and an arrangement for correcting, during pulsed gas metal-arc welding with a continuously fed electrode and material transfer from the electrode to the workpiece essentially in the form of non-short-circuiting drops, the power supply for the welding process on the basis of the occurrence of brief short circuits between the electrode and the workpiece. The correction is carried out in a regulating process in which the power supply is in the main regulated depending on the arc voltages so that a constant arc length is obtained. The correction facilitates welding using a very short arc.

BACKGROUND

In gas metal-arc welding using a continuously fed fusible electrode, usually called MIG/MAG welding, the workpiece is heated principally by the arc. The electrode is heated on the one hand by the power generated when the welding current flows through the electrode projection, that is to say the free electrode end between the contact nozzle, where the current transfer to the electrode takes place, and the arc, and on the other hand by the arc itself. Basic regulation of the welding process is aimed at obtaining a fusion rate of the electrode that corresponds to the electrode feed rate. Further aims of regulation may be, for example, to influence the quantity of heat supplied to the workpiece.

MIG/MAG welding is carried out in one of three states. In the case of short-arc welding, the material transfer from the electrode to the workpiece takes place by means of large short-circuiting drops, as shown in principle in FIG. 2. By virtue of the fact that the process consists of alternating arcs and short-circuiting drop transfers, the average voltage between the electrode and the workpiece is low and the heat transfer to the basic material is thus moderate. When the power supplied is increased, the mixed-arc range is entered, in which the material transfer is carried out by means of a mixture of short-circuiting and non-short-circuiting drops. The result is an unstable arc with a great deal of welding splash and welding smoke. Welding in this range is usually avoided. When the power supply is sufficiently great, the process enters the spray range, in which the material transfer is carried out by small finely-distributed drops without short-circuits, as shown in FIG. 3. The quantity of splash is clearly lower than in the case of short-arc welding. The heat supply to the basic material is greater in this case and the method is suitable principally for thicker material to be welded.

The third state is called pulsed welding and involves using advanced regulation to control the separation itself of the drops with the aid of a suitable current pulse. Each pulse separates a drop and the drops are sufficiently small so as not to short-circuit. This method, which is often called synergic pulsing, affords advantages from the spraying range in the form of low welding splash without the disadvantages of the great heat transfer.

So as to obtain stable conditions with uniform welding results even in the case of varying gun-guidance, the arc length is regulated. A method of doing this is described in EP 387 223. In this known method, the arc voltage is measured and compared with a reference value, and the current for the welding process is regulated on the basis of the calculated voltage difference so that the fusion rate increases when the arc voltage is lower than the reference value and decreases in the opposite case.

In the welding of thin plate, a low heat supply to the basic material and thus a short arc length are required in order to reduce the risk of burning through. At the same time, freedom from splashing is as always highly desirable. Pulsed welding gives freedom from splashing but greater heat than short-arc welding. It is therefore desirable to weld using the shortest possible arc length without the material transfer taking place via short-circuiting drops which explode easily and thus cause splashing.

Another reason for keeping the arc short is that a long arc destroys the gas protection in the case of, for example, aluminium welding.

EP 0 170 248 describes a welding machine for pulsed MIG/MAG welding, in which the equipment is regulated depending on the difference between a preset desired value for the number of drop short-circuits per unit of time and the actual number of short-circuits taking place. This regulating method gives a short arc and thus low heat transfer to the workpiece. One disadvantage, however, is that it involves completed drop short-circuits with the attendant risk of welding splash. A further disadvantage is that, with this method, no arc-length regulation is possible if it is desired to weld using a longer arc and thus a greater heat supply to the workpiece takes place.

A further problem with pulsed welding is the requirement for very accurate parameter settings. This may cause great problems when access is poor and it is necessary to turn the welding gun during welding in confined spaces. It is then very difficult to maintain a constant height above the workpiece. In this case, it is important to use a regulating method that can handle great deviations.

THE OBJECT OF THE INVENTION

The object of the present invention is thus to make available a method and an arrangement for pulsed welding that completely or partly eliminate the problems of the known art.

The invention comprises a method and an arrangement for pulsed gas metal-arc welding with an electrode fed to the welding site continuously at a given rate, the fusion conditions being adapted in such a manner that the material transfer from the electrode to the workpiece takes place essentially without short-circuiting drops by the welding current being periodically increased to a pulse current of such size and duration that the current density in the electrode causes sufficient electromagnetic forces in order to separate one drop for each pulse, and where the arc length is stabilized by regulating the power supply for the arc by means of a regulator mainly on the basis of a measured arc voltage, characterized in that short-circuiting of the arc is detected as arc-voltage decreases and/or current increases, and in that the fusion power supplied is increased by the arc-length regulator being given an additional increase for each short-circuit detected.

As a result of the arc pressure, the molten pool is always in motion. When the arc length is shortened, the electrode end will briefly come into contact with the moving molten pool. These brief contacts do not normally lead to any material transfer, however, as the drop is retained on the electrode by forces directed towards the electrode. These repellant forces may, for example, be connected with the vaporization of principally oxidized alloying materials from the surface of the fusible electrode end. By detecting these brief short-circuits and, on the basis of their occurrence, increasing the power for the arc, the fusion rate and thus the arc length are increased. In this way, the procedure and the arrangement according to the invention make it possible to weld with minimum arc length without ending up in the short-arc range.

The method facilitates considerably synergic pulsing with a very short arc and thus makes possible virtually splash-free welding, even of thin plate. The method also offers considerably reduced sensitivity for parameter-setting accuracy and thus makes possible welding in situations that are very difficult to deal with.

Further advantageous features of the invention are indicated in the subclaims.

BRIEF DESCRIPTION OF THE DRAWINGS

The invention will now be described in greater detail with the aid of exemplary embodiments and with reference to the attached drawings, in which.

DESCRIPTION OF PREFERRED EMBODIMENTS

Figure 1:
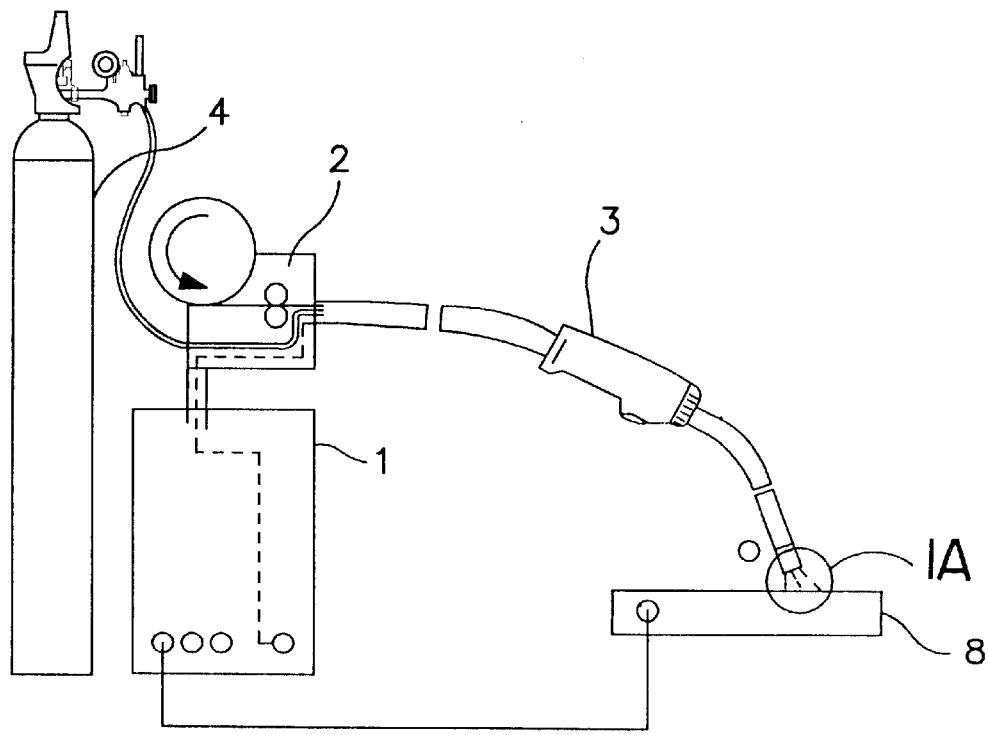
FIG. 1 shows diagrammatically an arrangement for MIG/MAG welding.
Figure 4:
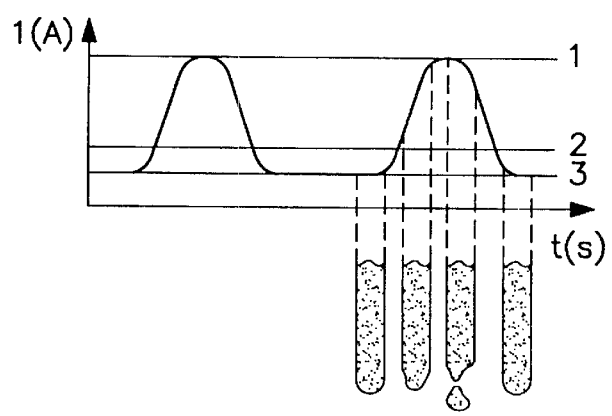
FIG. 4 shows a basic diagram for pulsed welding.

FIG. 1 shows an arrangement for MIG/MAG welding. This arrangement comprises a pulsed welding-current source 1 and a wire-feed mechanism 2. The arrangement also comprises a welding gun and a gas container 4 connected thereto. The welding gun comprises a front nozzle comprising an outer pipe 5 through which the gas is guided out, and, arranged centrally in this pipe, an inner pipe, the contact nozzle 6, through which the electrode 7 is guided. The electrode 7 and the workpiece 8 are connected in a conventional manner to the welding-current source 1 so that a potential difference is formed between them. The arrangement is controlled so that the material transfer from the electrode to the workpiece takes place essentially without short-circuiting drops (FIG. 4). This is effected by the welding current being periodically increased to a pulse current of such size and duration that the current density in the electrode causes sufficient electromagnetic forces in order to separate one drop for each pulse.

In FIG. 4, the principle of pulsed welding is shown, in which the current strength increases in pulses, which leads to separation of drops from the electrode end. Current level 1 corresponds in this connection to the peak value of the pulses, current level 2 to the average current level and current level 3 to a background current level.

Figure 5:
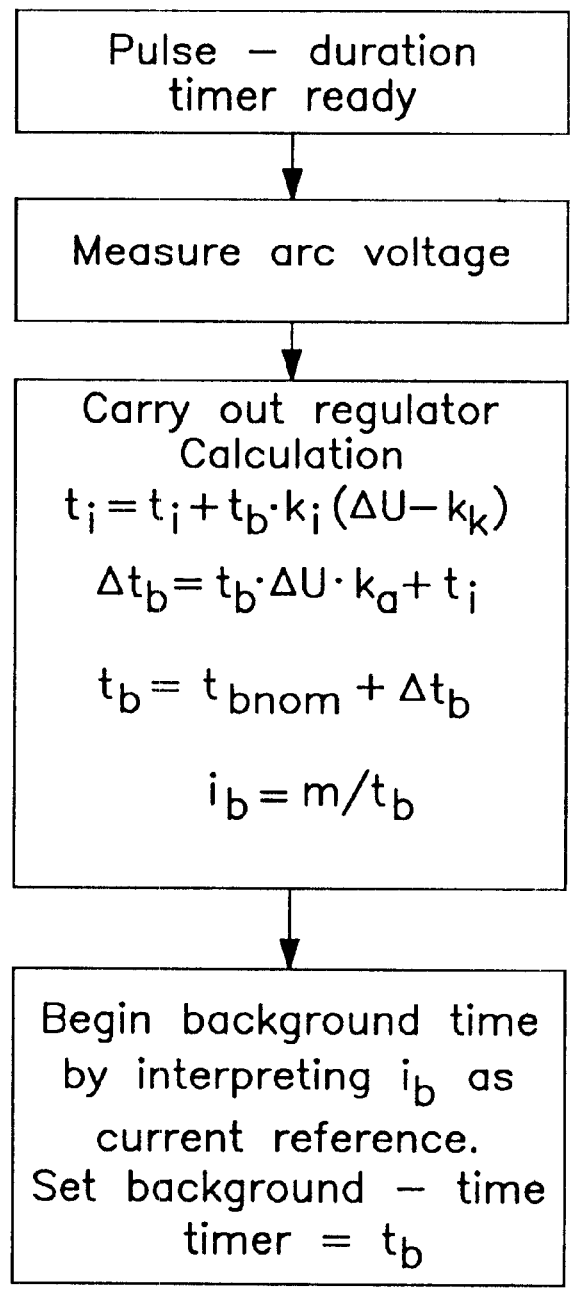
FIG. 5 shows a flow diagram for regulation according to the invention.

The arrangement also comprises a regulator according to FIG. 5 for stabilizing the arc length so that the fusion rate is adapted to the actual electrode feed rate. This is carried out mainly by the power supply being controlled on the basis of measured arc voltage.

FIG. 5 shows how regulation by the regulator according to the invention takes place. First, the regulator reads a pulse-duration timer so as to start together with a new period of the pulse cycles. As a result of the arc pressure, the molten pool is always in motion. When the arc length is shortened, the electrode end will briefly come into contact with the moving molten pool. These brief contacts do not normally lead to any material transfer, however, as the drop is retained on the electrode by forces directed towards the electrode. These repellant forces may, for example, be connected with the vaporization of principally oxidized alloying materials from the surface of the fusible electrode end. These short-circuits are detected by identifying arc-voltage decreases and/or current increases, and the regulator is given an additional increase for each short-circuit detected.

Then, regulator calculations are carried out according to:

$$t_i = t_i + t_b \cdot k_i (\Delta U - k_k)$$

$$\Delta t_b = t_b \cdot \Delta U \cdot k_a + t_i$$

$$t_b = t_{bnom} + \Delta t_b$$

$$i_b = m/t_b$$

where:

$t_i$=integration sum $\Delta U$=error signal in arc length regulation $k_a$, $k_i$=amplification factors for the proportional and, respectively, integrating part in the arc-length regulation $t_b$=background time $i_b$=background current $t_{bnom}$=nominal background time m=constant for current/time area during background time $k_k$ is set to a positive value if there has been a short-circuit during the previous period of time, otherwise to zero.

Finally, $i_b$ is interpreted as current reference and a background-time timer is set to $t_b$. In this way, the fusion power supplied is thus increased on detection of a short-circuit, and the integrating part of the arc-length regulator increases the fusion power as long as short-circuits occur. The power supply is influenced by regulating the size and duration of the background current. Then the regulating process is repeated.

Preferably, only short-circuits shorter than 500 μs generate an additional increase for the regulator as it is principally short-circuits of short duration that do not involve material transfer that are relevant in regulation. By detecting brief short-circuits and, on the basis of their occurrence, increasing the power for the arc, the fusion rate and thus the arc length are increased. In this way, the procedure and the arrangement according to the invention make it possible to weld with minimum arc length without ending up in the short-arc range, as the regulating system according to the invention reacts before the actual short-circuit that brings about material transfer from the electrode to the workpiece. The invention therefore results in a considerable improvement on the previously known art, in particular as far as welding with short arc lengths is concerned, and with regard to the tolerance range for setting parameters.

The arc-length regulator described can of course be realized in both software and hardware and in digital and/or analogue form.

What is claimed is:

1. A method for pulsed gas metal-arc welding with an electrode fed to the welding site continuously at a given rate, comprising the steps of regulating fusion power such that the fusion conditions are adapted in such a manner that the material transfer from the electrode to the workpiece takes place essentially without short-circuiting drops by the welding current being periodically increased to a pulse current of such size and duration that the current density in the electrode causes sufficient electromagnetic forces in order to separate one drop for each pulse, and stabilizing the arc length by regulating the power supply for the arc, by means of an arc length regulator, mainly on the basis of a measured arc voltage, wherein short-circuiting of the arc is detected as arc-voltage decreases and current increases, and detecting each short-circuit, and adjusting the arc length regulator to thereby increase the fusion power over an existing fusion power upon each short-circuit being detected.

2. The method according to claim 1, further comprising the step of maintaining the fusion power for a short circuit and increasing the fusion power for each short circuit as long as short-circuits occur.

3. The method according to claim 2, wherein only short-circuits shorter than 500 µs generate an additional increase.

4. The method according to claim 3, wherein the power supply is influenced by regulating the value and time of the background current.

5. The method according to claim 2, wherein the power supply is influenced by regulating the value and time of the background current.

6. The method according to claim 1, wherein the power supply is influenced by regulating the value and time of the background current.

7. An arrangement for pulsed gas metal-arc welding comprising a welding-power unit, a wire-feed mechanism, adapted for in the main non-short-circuiting material transfer from the electrode to the workpiece by periodically increasing the welding current to a pulse current of such size and duration that the current density in the electrode causes sufficient electromagnetic forces in order to separate one drop for each pulse, and a regulator comprising an arrangement being configured to regulate the power supply for the arc for stabilizing the arc length mainly on the basis of a measured arc voltage, wherein the regulator is also adapted to detect arc-voltage decreases and current increases indicating short-circuits of the arc, and wherein the power regulator is configured to give an additional increase of the welding power for each short-circuit detected.

8. The arrangement according to claim 7, wherein the regulator comprises an integrating part adapted to increase the welding power as long as short-circuits occur.

9. The arrangement according to claim 8, wherein the regulator is adapted to generate an additional increase only for short-circuits shorter than 500 µs.

10. The arrangement according to claim 9, wherein the regulator is configured to influence the power supply by means of the value and time of the background current.

11. The arrangement according to claim 8, wherein the regulator is configured to influence the power supply by means of the value and time of the background current.

12. The arrangement according to claim 7, wherein the regulator is configured to influence the power supply by means of the value and time of the background current.

13. A method for pulsed gas metal-arc welding with an electrode fed to the welding site continuously at a given rate, comprising the steps of regulating fusion power such that fusion conditions are adapted in such a manner that the material transfer from the electrode to the workpiece takes place essentially without short-circuiting drops by the welding current being periodically increased to a pulse current of such size and duration that the current density in the electrode causes sufficient electromagnetic forces in order to separate one drop for each pulse, and stabilizing the arc length by regulating the power supply for the arc, by means of an arc length regulator, mainly on the basis of a measured arc voltage, and detecting each short-circuit, and adjusting the arc length regulator to thereby increase the fusion power over an existing fusion power for each short-circuit detected.

14. The method according to claim 13, wherein short-circuiting of the arc is detected as arc-voltage decreases and current increases.

* * * * *

UNITED STATES PATENT AND TRADEMARK OFFICE
CERTIFICATE OF CORRECTION

Figure 1A:
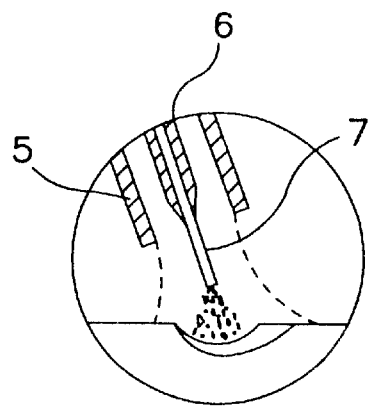
Figure 2:
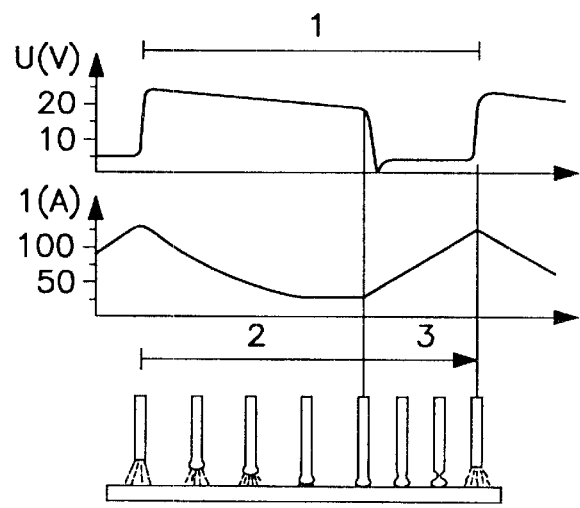
FIG. 2 shows how the current and the voltage change when a drop is transferred between the welding electrode and the workpiece in the case of short-arc welding.
Figure 3:
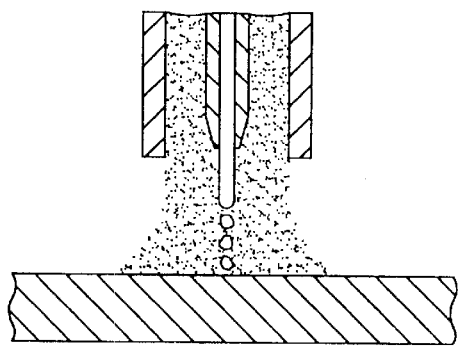
FIG. 3 shows a cross-sectional view of the lower part of the welding nozzle and a workpiece in the case of welding in the spray range.

PATENT NO.     : 6,388,233 B1
DATED          : May 14, 2002
INVENTOR(S)    : Per Åberg and Lars Bengtsson It is certified that error appears in the above-identified patent and that said Letters Patent is hereby corrected as shown below:

<u>Column 3,</u>
Between lines 19 and 20, insert the following new paragraph:
-- Fig. 1A shows an enlarged view of the circled portion of the arrangement of Fig. 1; --.
Line 37, after "thereto.", delete "The" and insert -- As can be seen in Fig. 1A, the --.

Signed and Sealed this

Fourteenth Day of January, 2003

JAMES E. ROGAN
*Director of the United States Patent and Trademark Office*